US008745047B2

United States Patent
Fein et al.

(10) Patent No.: US 8,745,047 B2
(45) Date of Patent: Jun. 3, 2014

(54) MEDIA RECOMMENDATION AND ACQUISITION SYSTEM

(75) Inventors: Gene Fein, Malibu, CA (US); Edward Merritt, Lenox, MA (US)

(73) Assignee: Empire Technology Development LLC, Wilmington, DE (US)

(*) Notice: Subject to any disclaimer, the term of this patent is extended or adjusted under 35 U.S.C. 154(b) by 392 days.

(21) Appl. No.: 12/200,438

(22) Filed: Aug. 28, 2008

(65) Prior Publication Data

US 2010/0057778 A1    Mar. 4, 2010

(51) Int. Cl.
G06F 17/30 (2006.01)
(52) U.S. Cl.
CPC .................. *G06F 17/30867* (2013.01)
USPC .......................................................... 707/732
(58) Field of Classification Search
CPC ............... G06F 17/30053; G06F 17/30772
USPC ................................................. 707/754, 732
See application file for complete search history.

(56) References Cited

U.S. PATENT DOCUMENTS

| | | | | |
|---|---|---|---|---|
| 6,611,754 B2* | 8/2003 | Klein | | 701/424 |
| 6,636,836 B1* | 10/2003 | Pyo | | 705/7.29 |
| 7,124,087 B1* | 10/2006 | Rodriguez et al. | | 705/5 |
| 7,124,125 B2* | 10/2006 | Cook et al. | | 1/1 |
| 7,533,061 B1* | 5/2009 | Cheng et al. | | 705/50 |
| 7,653,761 B2* | 1/2010 | Juster et al. | | 710/18 |
| 7,756,753 B1* | 7/2010 | McFarland | | 705/26.1 |
| 7,996,422 B2* | 8/2011 | Shahraray et al. | | 707/770 |
| 8,239,275 B1* | 8/2012 | Lyren et al. | | 705/26.1 |
| 2002/0032905 A1* | 3/2002 | Sherr et al. | | 725/38 |
| 2004/0093155 A1* | 5/2004 | Simonds et al. | | 701/200 |
| 2005/0091107 A1* | 4/2005 | Blum | | 705/14 |
| 2007/0100840 A1 | 5/2007 | Matsubara | | |
| 2007/0150444 A1* | 6/2007 | Chesnais et al. | | 707/3 |
| 2007/0220552 A1* | 9/2007 | Juster et al. | | 725/46 |
| 2008/0126929 A1* | 5/2008 | Bykov | | 715/700 |
| 2008/0183678 A1* | 7/2008 | Weston et al. | | 707/3 |

(Continued)

FOREIGN PATENT DOCUMENTS

| | | |
|---|---|---|
| JP | 2005-071381 | 3/2005 |
| JP | 2005-339523 | 12/2005 |

(Continued)

OTHER PUBLICATIONS

From Wikipedia, "Cloud computing," printed Jun. 25, 2008; en.wikipedia.org/wiki/Could_computing.

(Continued)

*Primary Examiner* — Sheree Brown
(74) *Attorney, Agent, or Firm* — Foley & Lardner LLP

(57) ABSTRACT

A method of providing a media recommendation is provided. The method includes receiving user provided information at a first device from a second device. The user provided information includes user preference information and user device information. The received user provided information is stored at a device accessible by the first device. Media information provided by a plurality of devices is monitored. The plurality of devices are accessible by the first device. A media recommendation is generated based on the received user provided information and the media information. If the user provided information includes an automatic download authorization, a media file associated with the generated media recommendation is downloaded to the first device from a content provider device. The downloaded media file is sent from the first device to the second device.

23 Claims, 7 Drawing Sheets

(56) References Cited

U.S. PATENT DOCUMENTS

| | | | |
|---|---|---|---|
| 2008/0257134 A1* | 10/2008 | Oppenheimer | 84/609 |
| 2009/0055377 A1* | 2/2009 | Hedge et al. | 707/5 |
| 2009/0056525 A1* | 3/2009 | Oppenheimber | 84/609 |

FOREIGN PATENT DOCUMENTS

| | | |
|---|---|---|
| JP | 2006-146980 | 6/2006 |
| JP | 2007-094738 | 4/2007 |
| JP | 2007-233515 | 9/2007 |
| JP | 2008-117222 | 5/2008 |
| JP | 2008-269382 | 11/2008 |
| WO | WO 2007/016463 | 2/2007 |
| WO | WO-2007/044590 | 4/2007 |
| WO | WO-2007/106260 | 9/2007 |

OTHER PUBLICATIONS

From Wikipedia, "MoodLogic," printed Aug. 22, 2008; en.wikipedia.org/wiki/MoodLogic.

Notice of Reasons for Rejection for JP 2008-291639 mailed Dec. 15, 2010 (with English translation).

Examination Report for German Pat. Appln. No. 10 2008 058 862.8, dated Jul. 25, 2011, 6 pp., and English translation, 5 pp.

* cited by examiner

MEDIA RECOMMENDATION AND ACQUISITION SYSTEM

BACKGROUND

Recommendation systems can enhance the selection process for users. For media segments, recommendations are available to provide recommendations for various media including video, audio, books, software, images, papers, etc. Recommendation systems may be based on research models or based upon collaborative filtering. Some systems create special rules and combine one or more recommendation philosophies in generating suggestions for users. Conventional models of recommendation usually function based on the past behavior of the user which is provided to the recommendation system to generate recommendations. Past behavior can include browsing a music website, music downloaded via a music service, etc. In general, the more data that is available, the better the recommendation system can identify a user's likes and dislikes.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
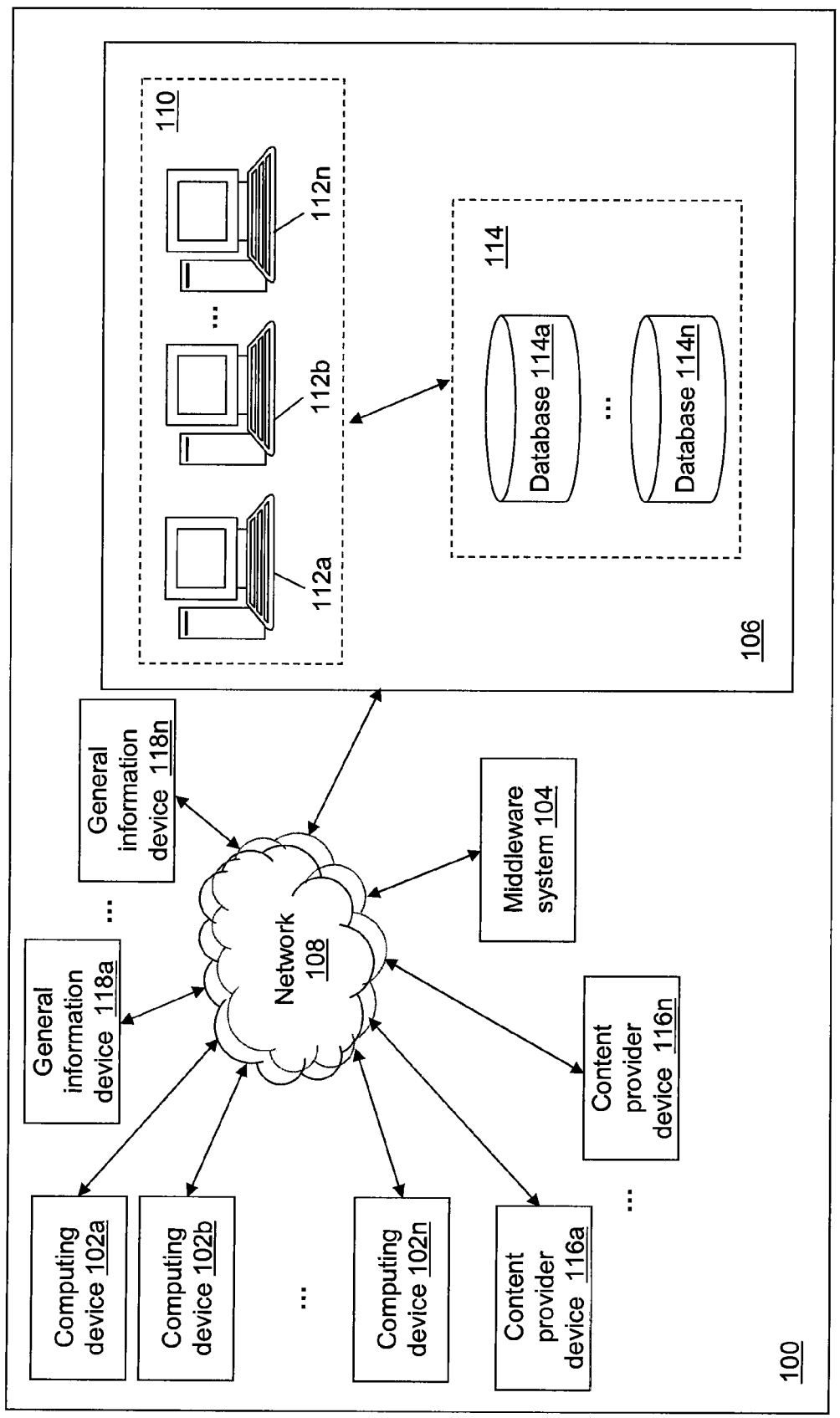
FIG. 1 depicts a block diagram of a media acquisition system in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a vide variety of different configurations, all of which are explicitly contemplated and make part of this disclosure.

Illustrative systems, methods, devices, etc. are described for the creation of a recommendation system to automatically analyze, organize, and augment a user's media collection. With reference to FIG. 1, a block diagram of a media acquisition system 100 is shown in accordance with an illustrative embodiment. In the illustrative embodiment, media acquisition system 100 monitors a user's collection of media, a user's express desires, and external data available from the user, such as travel plans, leisure activity schedule, driving habits, etc. along with other demographic data like age, sex, zip code of residence, etc. to create a fused recommendation service that can apply research or collaborative filtering to identify recommendations for purchase and/or download of various media to one or more user device of a user. Media acquisition system 100 may fill gaps in the user's media collection automatically based upon the user's desired budget and purchasing information if the user provides the appropriate authorization. Media acquisition system 100 may automatically send the purchased media to one or more user device of a user based on the user's specification, to maximize access to the media and the media experience for the user.

Media acquisition system 100 can include one or more user computing devices 102a, 102b, . . . , 102n, a middleware system 104, a cloud computing system 106, one or more media content provider devices 116a, . . . , 116n, and one or more general information devices 118a, . . . , 118n. The one or more user computing devices 102a, 102b, . . . , 102n may be a computer of any form factor including a laptop, a desktop, a server, an integrated messaging device, a personal digital assistant, a cellular telephone, an iPod™, etc. The one or more user computing devices 102a, 102b, . . . , 102n may be associated with the same and/or different users. The one or more media content provider devices 116a, . . . , 116n and the one or more general information devices 118a, . . . , 118n may be computers of any form factor. The devices associated with the one or more user computing devices 102a, 102b, . . . , 102n, middleware system 104, cloud computing system 106, the one or more media content provider devices 116a, . . . , 116n, and the one or more general information devices 118a, . . . , 118n may communicate using a network 108. Network 108 may include one or more type of network including a cellular network, a peer-to-peer network, the Internet, a local area network, a wide area network, a Wi-Fi network, a Bluetooth™ network, etc.

Cloud computing system 106 can include one or more servers 110 and one or more databases 114. A cloud computing system refers to one or more computational resources accessible over a network to provide users with on-demand computing services. The one or more servers 110 can include one or more computing devices 112a, 112b, . . . , 112n which may be computers of any form factor. The one or more databases 114 can include a first database 114a, . . . , and an nth database 114n. The one or more databases 114 can be housed on one or more of the one or more servers 110 or may be housed on separate computing devices accessible by the one or more servers 110 directly through wired or wireless connection or through network 108. The one or more databases 114 may be organized into tiers and may be developed using a variety of database technologies without limitation. The components of cloud computing system 106 may be implemented in a single computing device or a plurality of computing devices in a single location, in a single facility, and/or may be remote from one another.

Figure 2:
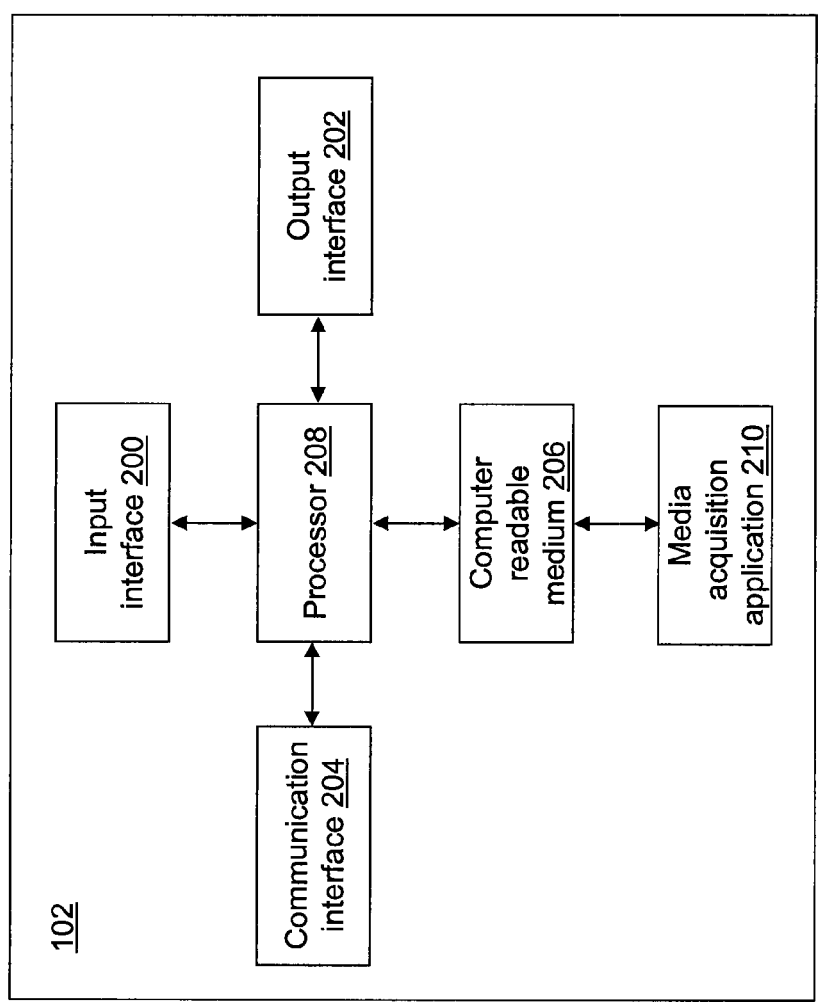
FIG. 2 depicts a block diagram of a user computing device of the media acquisition system of FIG. 1 in accordance with an illustrative embodiment.

With reference to FIG. 2, a block diagram of a user computing device 102 of media acquisition system 100 is shown in accordance with an illustrative embodiment. User computing device 102 can include an input interface 200, an output interface 202, a communication interface 204, a computer-readable medium 206, a processor 208, and a media acquisition application 210. Different and additional components may be incorporated into user computing device 102 without limitation. Media acquisition application 210 provides a graphical user interface with user selectable and controllable functionality. Media acquisition application 210 may include a browser application and/or other user interface based application that interacts with middleware system 104 to automatically, or under control of the user, receive media based on a recommendation information generated by media acquisition system 100.

Input interface 200 provides an interface for receiving information from the user for entry into user computing device 102 as known to those skilled in the art. Input interface 200 may interface with various input technologies including, but not limited to, a keyboard, a pen and touch screen, a mouse, a track ball, a touch screen, a keypad, one or more buttons, etc. to allow the user to enter information into user computing device 102 or to make selections presented in a user interface displayed using a display under control of media acquisition application 210. Input interface 104 may provide both an input and an output interface. For example, a touch screen both allows user input and presents output to the user. User computing device 102 may have one or more input interfaces that use the same or a different interface technology.

Output interface 202 provides an interface for outputting information for review by a user of user computing device 102. For example, output interface 202 may include an interface to a display, a printer, a speaker, etc. The display may be any of a variety of displays including, but not limited to, a thin film transistor display, a light emitting diode display, a liquid crystal display, etc. The printer may be any of a variety of printers including, but not limited to, an ink jet printer, a laser printer, etc. User computing device 102 may have one or more output interfaces that use the same or a different interface technology.

Communication interface 204 provides an interface for receiving and transmitting data between devices using various protocols, transmission technologies, and media. The communication interface may support communication using various transmission media that may be wired or wireless. User computing device 102 may have one or more communication interfaces that use the same or different protocols, transmission technologies, and media.

Computer-readable medium 206 is an electronic holding place or storage for information so that the information can be accessed by processor 208. Computer-readable medium 206 can include, but is not limited to, any type of random access memory (RAM), any type of read only) memory (ROM), any type of flash memory, etc. such as magnetic storage devices (e.g., hard disk, floppy disk, magnetic strips, . . . ), optical disks (e.g., compact disk (CD), digital versatile disk (DVD), . . . ), smart cards, flash memory devices, etc. User computing device 102 may have one or more computer-readable media that use the same or a different memory media technology. User computing device 102 also may have one or more drives that support the loading of a memory media such as a CD, a DVD, a flash memory card, etc.

Processor 208 executes instructions as known to those skilled in the art. The instructions may be carried out by a special purpose computer, logic circuits, or hardware circuits. Thus, processor 208 may be implemented in hardware, firmware, software, or any combination of these methods. The term "execution" is the process of running an application or the carrying out of the operation called for by an instruction. The instructions may be written using one or more programming language, scripting language, assembly language, etc. Processor 208 executes an instruction, meaning that it performs the operations called for by that instruction. Processor 208 operably couples with input interface 200, with output interface 202, with communication interface 204, with computer-readable medium 206, and with media acquisition application 210 to receive, to send, and to process information. Processor 208 may retrieve a set of instructions from a permanent memory device and copy the instructions in an executable form to a temporary memory device that is generally some form of RAM. User computing device 102 may include a plurality of processors that use the same or a different processing technology.

Figure 3:
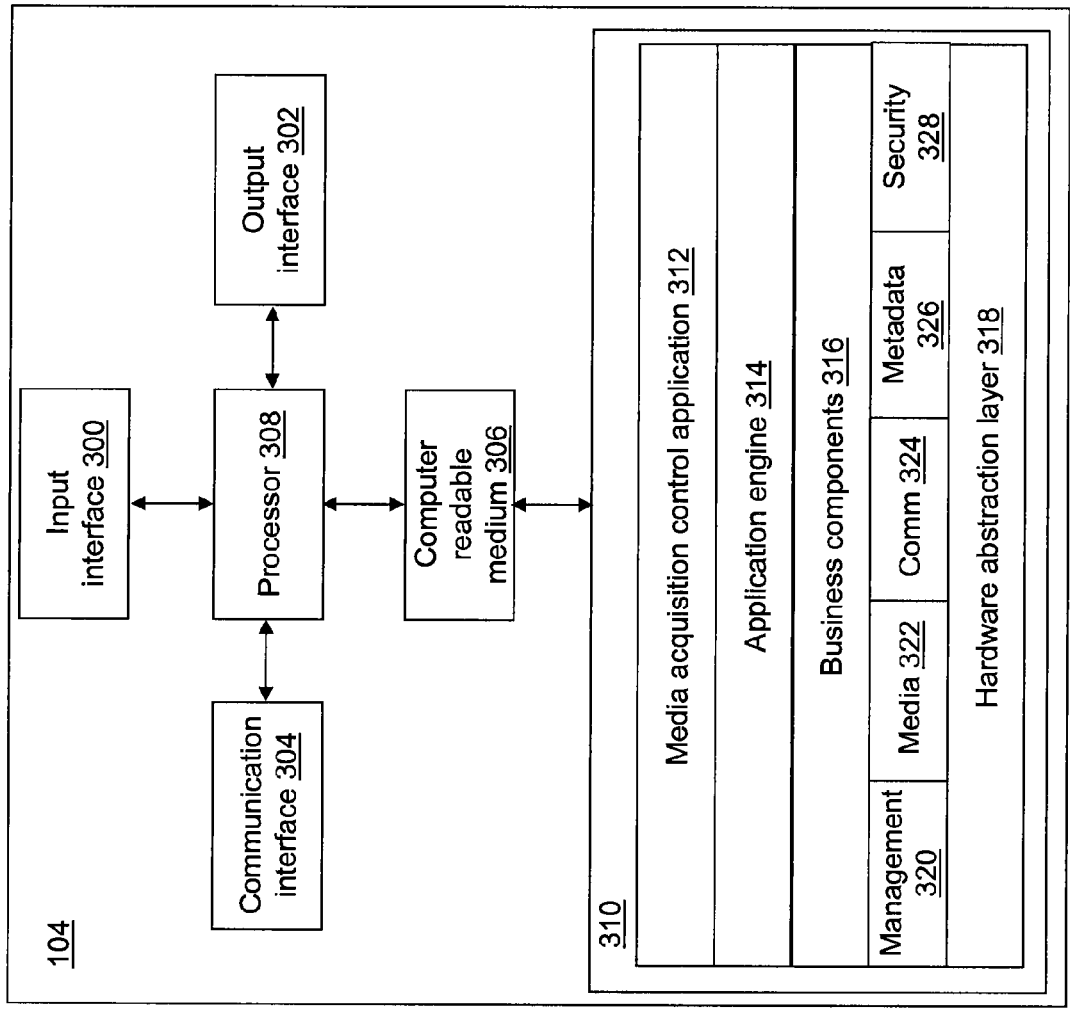
FIG. 3 depicts a block diagram of a middleware system of the media acquisition system of FIG. 1 in accordance with an illustrative embodiment.

With reference to FIG. 3, a block diagram of middleware system 104 of media acquisition system 100 is shown in accordance with an illustrative embodiment. Middleware system 104 can include an input interface 300, an output interface 302, a communication interface 304, a computer-readable medium 306, a processor 308, and a media acquisition architecture 310. Different and additional components may be incorporated into middleware system 104 without limitation. For example, middleware system 104 may include a database that is directly accessible by middleware system 104 or accessible by middleware system 104 using a network such as network 108. Middleware system 104 may further include a cache for temporarily storing information communicated to middleware system 104. Input interface 300 provides similar functionality to input interface 200. Output interface 302 provides similar functionality to output interface 202. Communication interface 304 provides similar functionality to communication interface 204. Computer-readable medium 306 provides similar functionality to computer-readable medium 206. Processor 308 provides similar functionality to processor 208.

Media acquisition architecture 310 can include a media acquisition control application 312, an application engine 314, business components 316, and a hardware abstraction layer 318. Media acquisition control application 312 includes the operations associated with interfacing between cloud computing system 106 and user computing device 102 to maintain and organize user media and to automatically generate recommendations for the purchase/download of media to user computing device 102. Media acquisition architecture 310 includes functionality to support automatic purchase, ratings, list favorites, favorites not purchased (based on recommendations or explicit information). In addition to traditional research based, collaborative filtering and popularity chart recommendations, Media acquisition architecture 310 incorporates third party data from the user such as credit card information and other available data, website browsing information, GPS data, and calendar information, demographic information to make media suggestions, etc.

Media acquisition architecture 310 may utilize load balancing servers, content servers, database servers, application servers, and registration servers. The application and registration servers facilitate the registration process for a user as well as the download of media acquisition application 210 and application updates. Middleware system 104 is configured to download the correct software application for the one or more user computing devices 102a, 102b, . . . , 102n based upon registration information received from the user. During the registration process the user may fill in certain fields that assist in the identification of the user's lifestyle choices and preferences. User related data is received from the one or more user computing devices 102a, 102b, . . . , 102n and formatted using the application and database servers. The load balancing servers sort user queries from data sent from the user and sort external data sources emanating from a user's access and applicability to media acquisition system 100. Middleware system 104 sends anonymous data points to cloud computing system 106 that constitute a user's current settings and information along with any new data and security specifications of cloud computing system 106.

Figure 4:
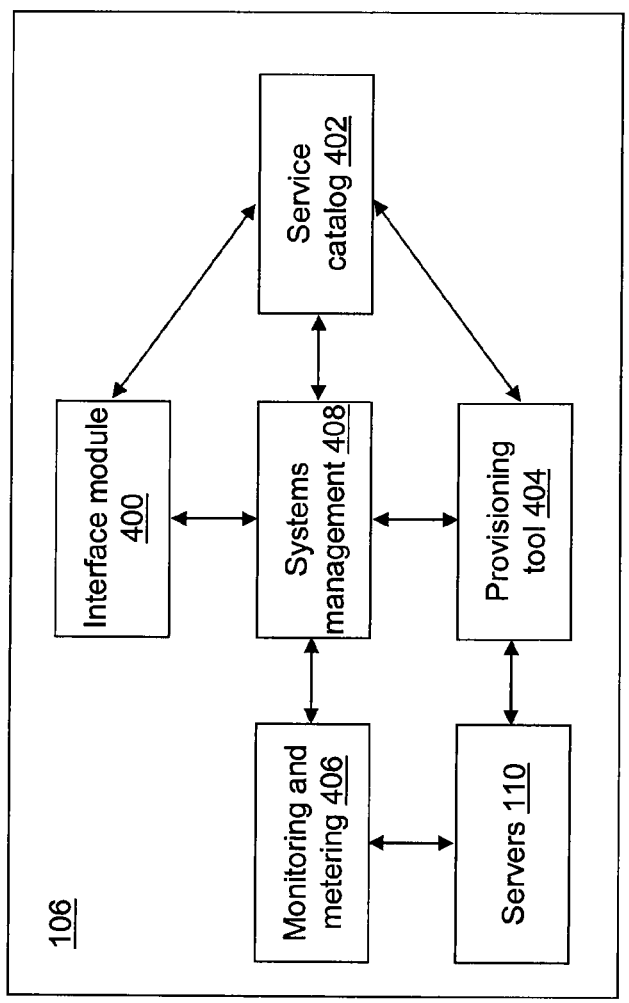
FIG. 4 depicts a block diagram of a cloud computing system of the media acquisition system of FIG. 1 in accordance with an illustrative embodiment.

With reference to FIG. 4, a block diagram of modules associated with cloud computing system 106 of media acquisition system 100 is shown in accordance with an illustrative embodiment. Cloud computing system 106 can include an interface module 400, a service catalog 402, a provisioning tool 404, a monitoring and metering module 406, a system management module 408, and the one or more servers 110. Different and additional components may be incorporated into cloud computing system 106 without limitation. For example, cloud computing system 106 may further include the one or more databases 114. Middleware system 104 interacts with interface module 400 to request services. Service catalog 402 provides a list of services that middleware system 104 can request. Provisioning tool 404 allocates computational resources from the one or more servers 110 to deliver the requested service and may deploy the required images for execution at the one or more servers 110. Monitoring and metering module 406 tracks the usage of the one or more servers 110 so the resources used can be attributed to a certain user possibly for billing purposes. System management module 408 manages the one or more servers 110. The one or more servers 110 can be interconnected as if in a grid running in parallel.

Interface module 400 may be configured to allow selection of a service from service catalog 402. A request associated with a selected service may be sent to system management module 408. System management module 408 identifies an available resource(s) such as one or more of servers 110 and/or one or more of databases 114. System management module 408 calls provisioning tool 404 to allocate the identified resource(s). Provisioning tool 404 may deploy a requested stack or web application as well.

Figure 5:
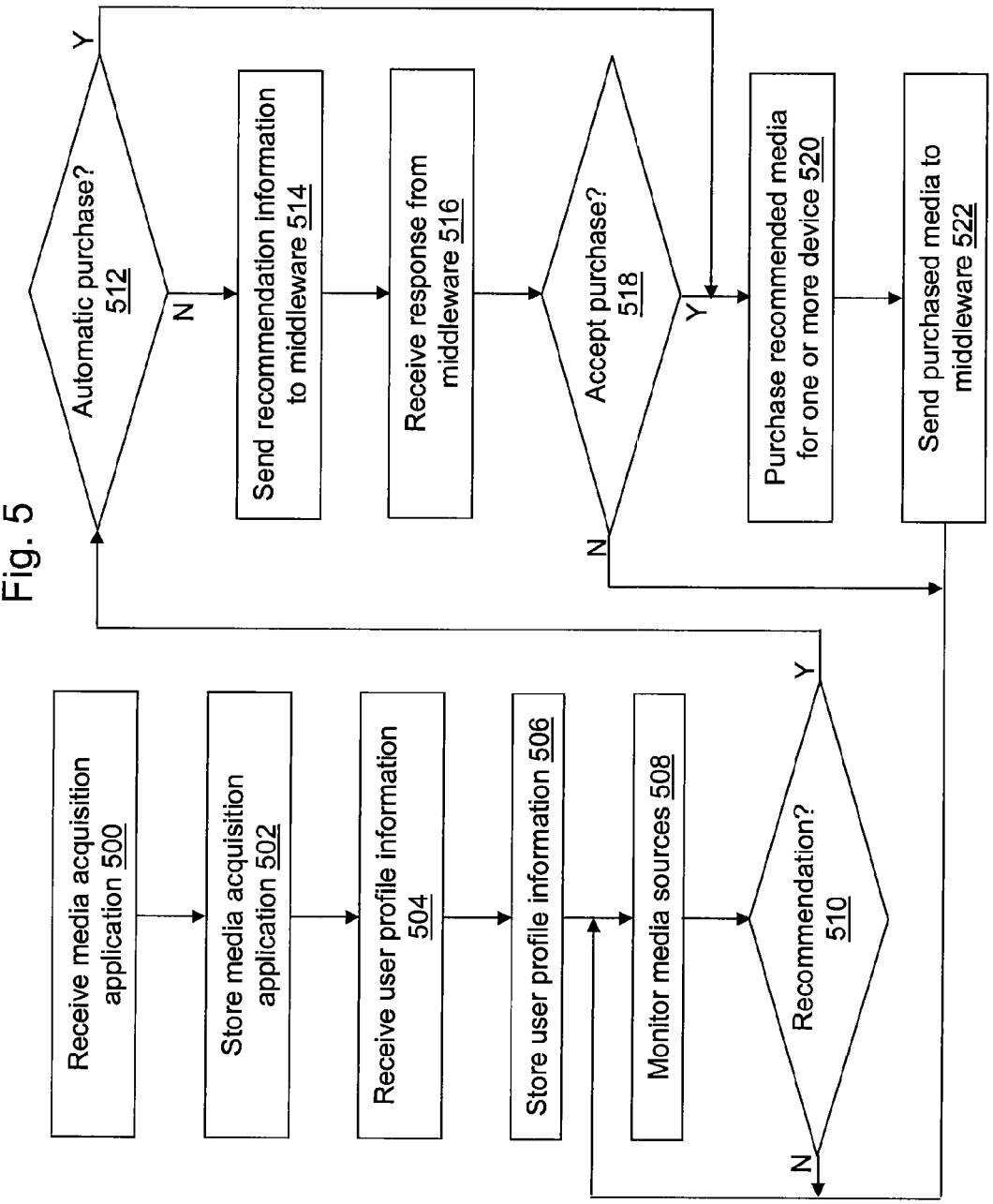
FIG. 5 depicts a flow diagram illustrating operations performed by the cloud computing system of FIG. 4 in accordance with an Illustrative embodiment.

With reference to FIG. 5, illustrative operations performed by cloud computing system 106 are described. Additional, fewer, or different operations may be performed, depending on the embodiment. The order of presentation of the operations of FIG. 5 is not intended to be limiting. In an operation 500, one or more media acquisition applications are received. The one or more media acquisition applications may be in a text format, an object code format, or an executable format. The received one or more media acquisition applications are stored to cloud computing system 106 in an operation 502. User profile information is received in an operation 504. For example, user profile information may include home and work/vocation address, age, sex, race, sexual orientation, daily, weekly, monthly and yearly income, entertainment and media preferences, daily/weekly/monthly/yearly schedule, spending habits, vacation preferences, restaurant preferences, social habits, political affiliations, hobbies, personality profile, media purchasing budget, user's existing media collection, automatic purchasing request, purchasing information, user device information and preferences, etc. In an operation 506, the user profile information is stored to cloud computing system 106.

In an operation 508, general information that can be accessed by the one or more media acquisition applications of cloud computing system 106 from the one or more general information devices 118a, . . . , 118n and new media release information that can be accessed by the one or more media acquisition applications of cloud computing system 106 from the one or more media content provider devices 116a, . . . , 116n is monitored to provide additional input into the media recommendation process. The general information can include information from news services, media guides, media reviews, weather and traffic patterns, health information, travel information, and other researchable areas that may provide general reference data to assist in determining a recommendation for the user. If a recommendation is not received in an operation 510, processing continues at operation 508 to continuously monitor the one or more media content provider devices 116a, . . . , 116n and the one or more general information devices 118a, . . . , 118n for media information that may assist in determining a recommendation for the user in the future.

If a recommendation is received in operation 510, processing continues at operation 512. A media recommendation is determined based on the stored user profile information and the media source information. The media recommendation may be determined using a number of recommendation techniques and multiple recommendation engines employing the media source information, user profile information, and user activity. For example, data may be scanned from user computing device 102 indicating emails or voice messages from a user named, "Peggy Sue" that may trigger the song recommendation. As another example, if weather reports indicate that it has rained in the user's location for the last few days, a recommendation for a weather related song may be generated. If it is April 1 and there is no tax software on the user computing device 102, a recommendation to download tax software may be generated. The recommendation engine may include a collaborative filtering model with rules based upon specific media expertise, a research model that generates recommendations based upon research conducted on the media tastes of sample groups of participants that match the user's demographic profile, recommendations based upon a user's current mood, and a hybrid approach that combines the first two methods and cross references available user data and current news and trends to sort the most viable options among the recommendations from both systems.

If an automatic purchase option was selected by the user and included in the user profile information, in an operation 512, processing continues at an operation 520. If an automatic purchase option was not selected by the user and included in the user profile information, processing continues at operation 514. In an operation 514, the determined recommendation is sent to middleware system 104. In an operation 516, a response is received from middleware system 104. If a user acceptance of the recommendation is received in an operation 518, processing continues at operation 520. If a user acceptance of the recommendation is not received in operation 518, processing continues at operation 508 to continuously monitor the one or more media content provider devices 116a, . . . , 116n and the one or more general information devices 118a, . . . , 118n for media information that may assist in determining a recommendation for the user in the future.

In operation 520, the recommended media is purchased/downloaded from a media content provider device of the one or more media content provider devices 116a, . . . , 116n using purchasing information provided in the user profile information, and, if appropriate, the budget information and existing media information is updated. In operation 522, the purchased/downloaded media is sent to middleware system 104. Processing continues at operation 508 to continuously monitor the one or more media content provider devices 116a, ..., 116n and the one or more general information devices 118a, ..., 118n for media information that may assist in determining a recommendation for the user in the future.

Figure 6:
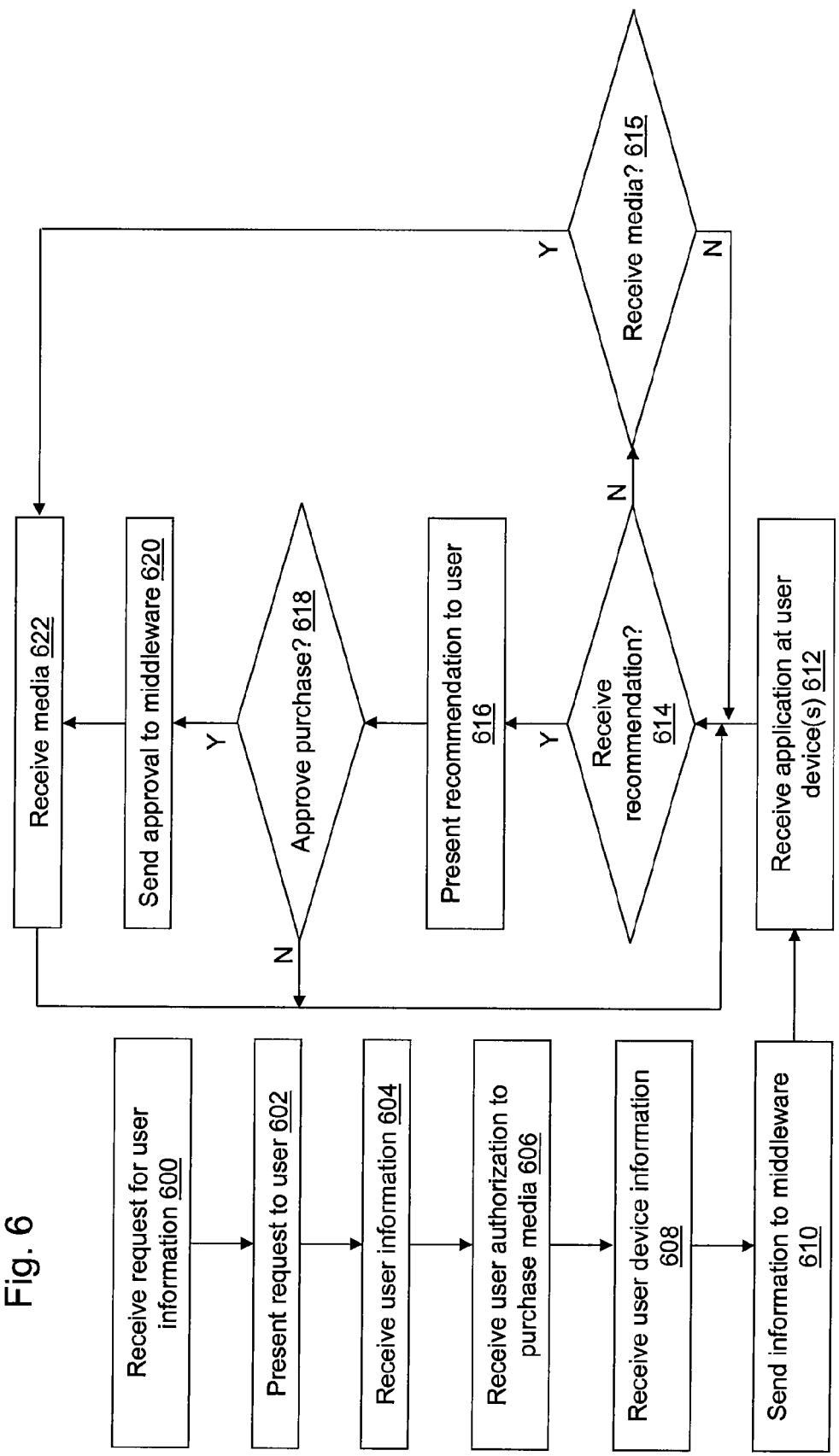
FIG. 6 depicts a flow diagram illustrating operations performed by the user computing device of FIG. 2 in accordance with an Illustrative embodiment.

With reference to FIG. 6, illustrative operations performed by user computing device 102 are described. Additional, fewer, or different operations may be performed, depending on the embodiment. The order of presentation of the operations of FIG. 6 is not intended to be limiting. In an operation 600, a first request for a user to enter information is received. For example, the user may access a website using a browser application which causes the first request to be received at user computing device 102. In an operation 602, the request for information is presented to the user. For example, the user may be presented with a series of questions to identify the user's preferences, habits, likes, dislikes, media collection, etc. In an operation 604, the user information is received. In an operation 606, user authorization information to purchase media automatically and a purchasing budget is received. In an operation 608, user device information is received which may include the type of device, the operating system, the hardware characteristics of the device, etc. and the types of media the user's requests for download to the device. In an operation 610, the received user information, the received user authorization information, and the received user device information is sent to middleware system 104 in one or more messages. In an operation 612, the media acquisition application 210 is received and installed, if necessary, at the one or more user computing device(s) identified by the user device information. After being received and installed, if necessary, the one or more user computing device(s) execute media acquisition application 210.

If a recommendation is received from middleware system 104 in an operation 614, processing continues at an operation 616. If a recommendation is not received in operation 614, processing continues at an operation 615. If media is received in operation 615, processing continues at an operation 622. For example, the user may have provided user authorization information to purchase media automatically. The user may set the dollar amounts of specific kinds of media per month based upon available media recommendation and media availability in one or more of the user's devices. The user may provide user authorization information to purchase media automatically based upon media type, amount spent, timing, etc.

If media is not received in operation 615, processing continues at operation 614 to continuously monitor for a recommendation or for receipt of media automatically from middleware system 104. In operation 616, the recommendation is presented to the user of user computing device 102, for example, using output interface 202. If a user approval to purchase/download the media is received in an operation 618, for example, using input interface 200, processing continues at operation 620. If a user approval to purchase/download the media is not received in operation 618, processing continues at operation 614 to continuously monitor for a recommendation or for receipt of media automatically from middleware system 104. In operation 620, the approval to purchase/download the media is sent to middleware system 104. In operation 622, the media is received at user computing device 102 and/or at one or more other user device in the appropriate format based on the user device information. Processing continues at operation 614 to continuously monitor for a recommendation or for receipt of media automatically from middleware system 104.

Media acquisition application 210 may also support operations to organize the media according to the user's device(s). The organization of the media may be sorted according to the application guidelines that include different options to sort by media type, last played, favorites, playlist, time of day (i.e., software has a priority to entertainment media during the work day), etc. The organizational interface for the media may be tailored to the requirements of user computing device 102 and any other of the user's devices to which the media is downloaded. Interoperability between media files and devices may result in automated synchronizing of media between the user's devices under control of media acquisition system 100. A user's desire to have media from one device available on another device, in the event of media type incompatibility between devices, may be supported by generating a request of a vendor who can supply the desired media file to the desired device to deliver the same content in the preferred media format. This could result in additional charges or surcharges to the user depending on the vendor and rights rules associated with the media. For example, the user may request to view a video file on their home television via a media synchronization with a portable wireless device. However, the wireless device may not have a hardware configuration robust enough to present an acceptable viewing experience on a large television screen. In such an instance, the media could be received from the local cable company, or a service that delivers online movie files in a large enough data size to accommodate a large television screen. The user may be prompted about the unavailability of certain media for certain formats and may also be prompted to acknowledge a purchase transaction, if the user has not already explicitly accepted terms to supply the media and bill later or to provide credit card purchasing information. If there is a billing issue, media acquisition application 210 may prompt the user for a verifiable payment method.

Figure 7:
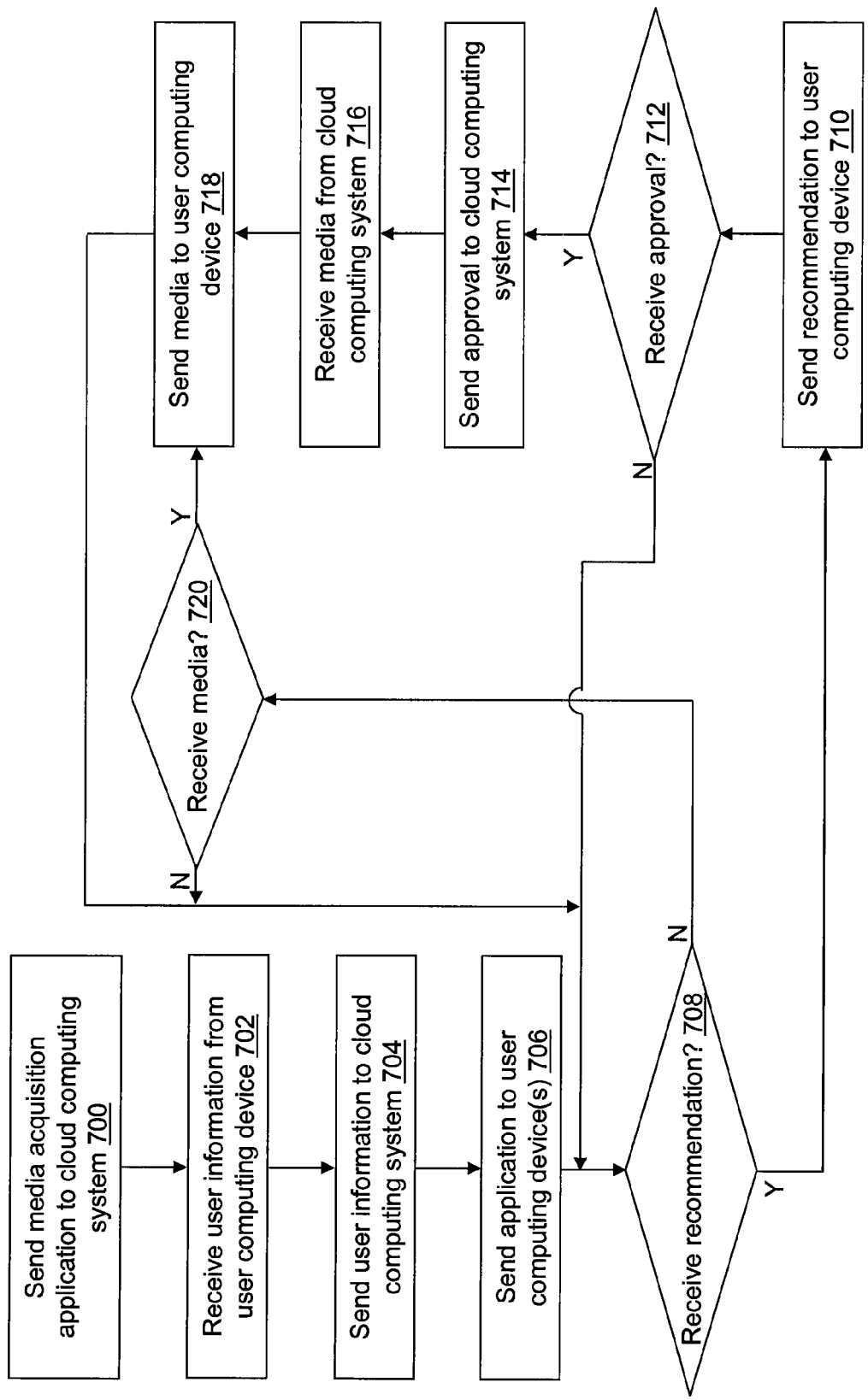
FIG. 7 depicts a flow diagram illustrating operations performed by the middleware system of FIG. 3 in accordance with an Illustrative embodiment.

With reference to FIG. 7, illustrative operations performed by middleware system 104 are described. Additional, fewer, or different operations may be performed, depending on the embodiment. The order of presentation of the operations of FIG. 7 is not intended to be limiting. Middleware system 104 defines the parameters for returning readable data to computing device 102 using application programming interfaces, for example, associated with operating system compatibility, display capability, media player capability, etc. In an operation 700, the one or more media acquisition applications are sent to cloud computing system 106. In an operation 702, the user information is received from user computing device 102. In an operation 704, the received user information is sent to cloud computing system 106. In an operation 706, the one or more media acquisition application 210 are sent to the user's computing device(s) identified in the received user information.

If a recommendation is received from cloud computing system 106 in an operation 708, processing continues at an operation 710. If a recommendation is not received in operation 708, processing continues at an operation 720. If media is received in operation 720, processing continues at an operation 718. If media is not received in operation 720, processing continues at operation 708 to continuously monitor for a recommendation or for receipt of media automatically from cloud computing system 106. In operation 710, the recommendation is sent to user computing device 102. If a user approval to purchase/download the media is received in an operation 712, processing continues at operation 714. If a user approval to purchase/download the media is not received in operation 712, processing continues at operation 708 to continuously monitor for a recommendation or for receipt of media automatically from cloud computing system 106. In operation 714, the approval to purchase/download the media is sent to cloud computing system 106. In operation 716, the media is received from cloud computing system 106. In operation 718, the received media is sent to one or more of the user's devices possibly including user computing device 102. Processing continues at operation 708 to continuously monitor for a recommendation or for receipt of media automatically from cloud computing system 106.

The system continues to function on an ongoing basis, noting when user computing device 102 is on so that the user can be contacted. In the absence of user computing device 102 being on, media acquisition system 100 may send recommendations in emails. The user may instruct media acquisition system 100 to stop generating recommendations at any time, to cache the recommendations, or to modify the user's settings in any way, including unsubscribing from media acquisition system 100. Media acquisition system 100 can also print traditional mail or courier reminders as a service feature, if selected by the user. Thus, the user may receive real-time recommendations to one or more of the user's computing devices using various communication methods. Some recommendations may be directed to specific devices based on parameters set by the user as part of the user device information.

The recommendation logic systems are persistently subject to evolve and be updated based on data available to media acquisition system 100. The programming changes can be automated based upon conditions that exist and are computed by cloud computing system 106. Updated versions of the entire database logic can be exchanged between cloud computing system 106 and middleware system 104 for backup, archival, or auxiliary use. Media acquisition system 100 may create an affinity program for frequent users. Media acquisition system 100 may charge users for use and/or may charge advertisers for access to media acquisition system 100 or integrate a hybrid economic model for use.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits, Field Programmable Gate Arrays, digital signal processors, or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A device comprising:
    a communication interface configured to receive first information from a first user device;
    a memory configured to store the first information; and
    a processor operatively coupled to the memory and configured to receive the first information wherein the first information includes user provided information, wherein the user provided information comprises user preference information and user device information, wherein the user device information includes a device type of the first user device, wherein the user provided information is received from a user for which a media recommendation is to be generated, and wherein the user provided information further comprises one or more of a travel plan of the user, an activity schedule of the user, and a driving habit of the user;
    store the received user provided information;
    monitor media information provided by a plurality of devices, wherein the plurality of devices are accessible by the device via the communication interface;
    generate the media recommendation based on the received user provided information, a purchasing budget specified by the user and received from the first user device, filtered user research data, and the media information;
    download a media file associated with the generated media recommendation from a content provider device, when the user provided information includes an automatic download authorization;
    send the downloaded media file to the first user device, wherein the downloaded media file is of a first media type that is compatible with the first user device;
    receive a request to provide the media file to a second user device, wherein a device type of the second user device is different than the device type of the first user device;
    determine that the media file is not compatible with the second user device;
    obtain a version of the media file that is of a second media type compatible with the second user device; and
    send the media file of the second media type to the second user device.

2. The device of claim 1, wherein generating the media recommendation comprises executing a media acquisition application received from the first user device using the stored user provided information and the media information.

3. The device of claim 1, wherein the user provided information further comprises user device information related to a plurality of user devices.

4. The device of claim 3, wherein the processor is further configured to determine a user device of the plurality of user devices to which to send the downloaded media file based on the user device information.

5. The device of claim 4, wherein the processor is further configured to select the media file based on a file type compatibility with the determined user device.

6. The device of claim 1, wherein, if the user provided information does not include an automatic download authorization, the processor is further configured to:
    send the generated media recommendation to the first user device;
    receive a response from the first user device; and
    download the media file associated with the generated media recommendation to the device, when the response includes an indication of acceptance of the generated media recommendation.

7. The device of claim 1, wherein the research data comprises at least one of collaborative filtering or user activity information, wherein the user activity information is unrelated to media content.

8. The device of claim 1, wherein the research data comprises general information received from at least one general information device.

9. A non-transitory computer-readable medium having instructions stored thereon, the instructions comprising:
   instructions to receive user provided information from a first user device, wherein the user provided information includes user preference information and user device information, wherein the user device information includes a device type of the first user device, wherein the user provided information is received from a user for which a media recommendation is to be generated, and wherein the user provided information further comprises one or more of a travel plan of the user, an activity schedule of the user, and a driving habit of the user;
   instructions to store the received user provided information;
   instructions to monitor media information provided by a plurality of devices, wherein the plurality of devices are accessible by the device;
   instructions to generate the media recommendation based on the received user provided information, a purchasing budget specified by the user and received from the first user device, filtered user research data, and the media information;
   instructions to download a media file associated with the generated media recommendation from a content provider device, when the user provided information includes an automatic download authorization;
   instructions to send the downloaded media file to the first user device, wherein the downloaded media file is of a first media type that is compatible with the first user device;
   instructions to receive a request to provide the media file to a second user device, wherein a device type of the second user device is different than the device type of the first user device;
   instructions to determine that the media file is not compatible with the second user device;
   instructions to obtain a version of the media file that is of a second media type compatible with the second user device; and
   instructions to send the media file of the second media type to the second user device.

10. The non-transitory computer-readable medium of claim 9, wherein the instructions to determine the recommendation comprise instructions to execute executing a media acquisition application received from the first user device using the stored user provided information and the media information.

11. The non-transitory computer-readable medium of claim 9, wherein the user provided information further includes user device information related to a plurality of user devices.

12. The non-transitory computer-readable medium of claim 11, wherein the instructions further comprise instructions to determine a user device of the plurality of user devices to which to send the downloaded media file based on the user device information.

13. The non-transitory computer-readable medium of claim 12, wherein the instructions further comprise instructions to select the media file based on a file type compatibility with the determined user device.

14. The non-transitory computer-readable medium of claim 9, wherein, if the user provided information does not include an automatic download authorization, the instructions further comprise:
   instructions to send the generated media recommendation to the first user device;
   instructions to receive a response from the first user device; and
   instructions to download the media file associated with the generated media recommendation to the device when the response includes an indication of acceptance of the generated media recommendation.

15. A method of providing a media recommendation, the method comprising:
   receiving user provided information at a first device, wherein the user provided information includes user preference information and user device information, wherein the user device information includes a device type of a first user device, wherein the user provided information is received from a user for which a media recommendation is to be generated, and wherein the user provided information further comprises one or more of a travel plan of the user, an activity schedule of the user, and a driving habit of the user;
   storing the received user provided information at a device accessible by the first device;
   monitoring media information provided by a plurality of devices, wherein the plurality of devices are accessible by the first device;
   generating the media recommendation based on the received user provided information, a purchasing budget specified by and received from the user, filtered user research data, and the media information;
   downloading a media file associated with the generated media recommendation to the first device from a content provider device, when the user provided information includes an automatic download authorization;
   sending the downloaded media file to the first user device, wherein the downloaded media file is of a first media type that is compatible with the first user device;
   receiving a request to provide the media file to a second user device, wherein a device type of the second user device is different than the device type of the first user device;
   determining that the media file is not compatible with the second user device;
   obtaining a version of the media file that is of a second media type compatible with the second user device; and
   sending the media file of the second media type to the second user device.

16. The method of claim 15, further comprising receiving a media acquisition application at the first device.

17. The method of claim 16, wherein generating the media recommendation comprises executing the received media acquisition application at the first device using the stored user provided information and the media information.

18. The method of claim 15, wherein the user provided information further includes user device information related to a plurality of user devices.

19. The method of claim 18, further comprising determining a user device of the plurality of user devices to which to send the downloaded media file based on the user device information.

20. The method of claim 15, further comprising, if the user provided information does not include an automatic download authorization:

sending the generated media recommendation to the first user device from the first device;

receiving a response from the first user device at the first device; and downloading the media file associated with the generated media recommendation to the first device, when the response includes an indication of acceptance of the generated media recommendation.

21. The method of claim 15, wherein the filtered research data comprises general information provided by the plurality of devices.

22. The method of claim 19, further comprising selecting the media file based on a file type compatibility with the determined user device.

23. A device comprising:

a communication interface configured to receive first information from a first user device;

a memory configured to store data; and a processor operatively coupled to the memory and configured to:

receive the first information wherein the first information includes user provided information including user preference information and user device information, wherein the user device information includes a device type of a first user device, wherein the user provided information is received from a user for which a media recommendation is to be generated, and wherein the user provided information further comprises a travel plan of the user, an activity schedule of the user, and a driving habit of the user;

store the received user provided information;

monitor media information provided by a plurality of devices, wherein the plurality of devices are accessible by the device using the communication interface;

generate the media recommendation based on the received user provided information, a purchasing budget specified by the user and received from the first user device, filtered user research data, and the media information;

automatically purchase a media file associated with the generated media recommendation from a content provider device, when the user provided information includes an automatic purchase authorization;

transmit information associated with the purchased media file, wherein the purchased media file is of a first media type that is compatible with the first user device;

receive a request to provide the media file to a second user device, wherein a device type of the second user device is different than the device type of the first user device;

determine that the media file is not compatible with the second user device;

obtain a version of the media file that is of a second media type compatible with the second user device; and send the media file of the second media type to the second user device.

* * * * *

UNITED STATES PATENT AND TRADEMARK OFFICE
CERTIFICATE OF CORRECTION

PATENT NO. : 8,745,047 B2 Page 1 of 1
APPLICATION NO. : 12/200438
DATED : June 3, 2014
INVENTOR(S) : Fein et al.

It is certified that error appears in the above-identified patent and that said Letters Patent is hereby corrected as shown below:

In the Specification

Column 2, Line 1, delete "a vide" and insert -- a wide --, therefor.

Column 3, Line 55, delete "only)" and insert -- only --, therefor.

Column 7, Line 41, delete "recommendation" and insert -- recommendations --, therefor.

Column 10, Line 8, delete "and or" and insert -- and/or --, therefor.

In the Claims

Column 13, Line 51, in Claim 10, delete "execute executing a" and insert -- execute a --, therefor.

Signed and Sealed this
Twenty-fifth Day of November, 2014

Michelle K. Lee
*Deputy Director of the United States Patent and Trademark Office*